UNITED STATES PATENT OFFICE.

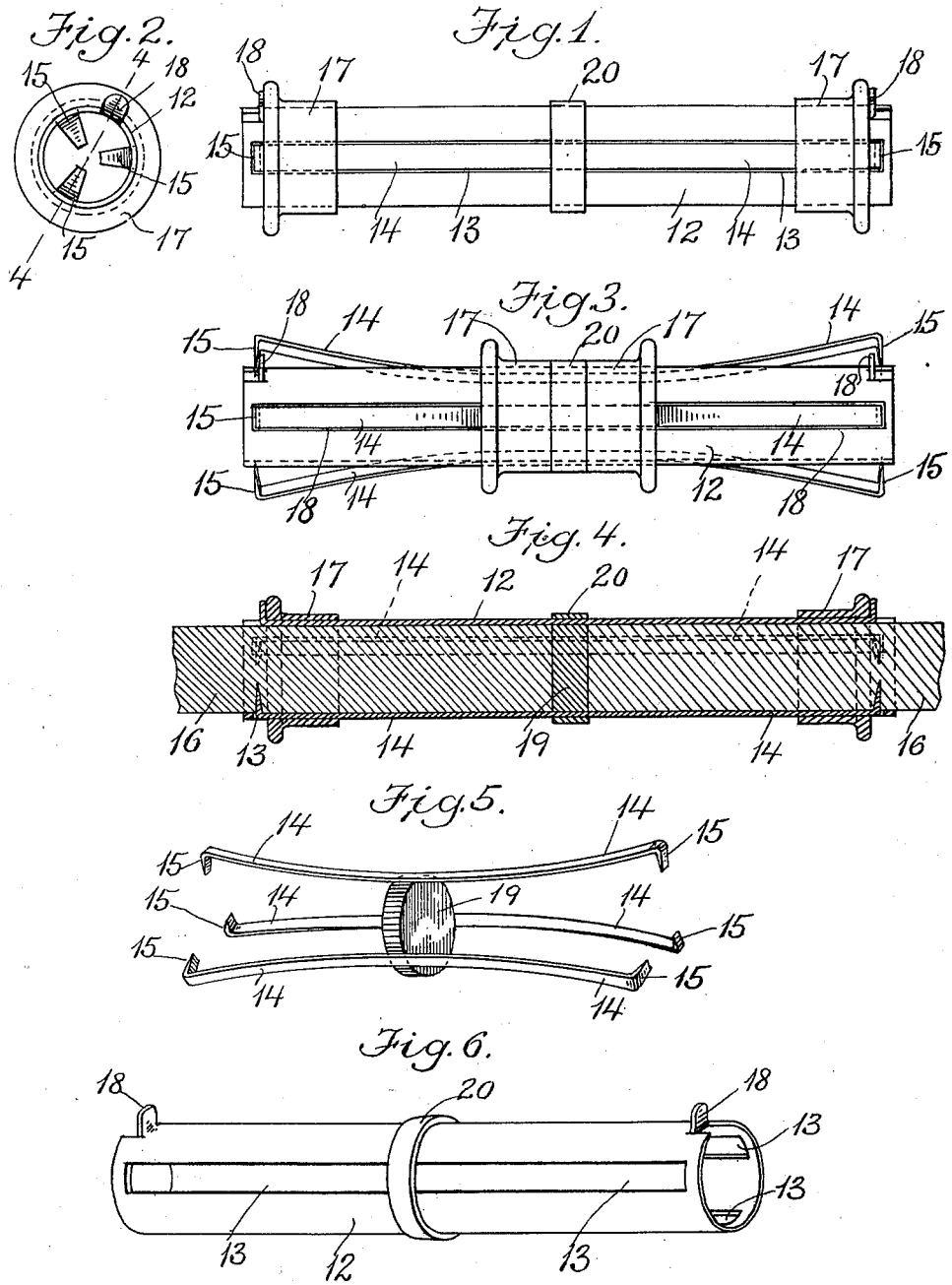

GIOVANNI MONGARDI, OF BOSTON, MASSACHUSETTS.

ROPE OR CORD COUPLING.

1,036,679.  Specification of Letters Patent.  Patented Aug. 27, 1912.

Application filed April 2, 1912. Serial No. 688,051.

*To all whom it may concern:*

Be it known that I, GIOVANNI MONGARDI, a subject of the King of Italy, and a resident of Boston, in the county of Suffolk and State of Massachusetts, have invented certain new and useful Improvements in Rope or Cord Couplings, of which the following is a specification.

This invention relates to clamps for connecting the ends of flexible ropes or cords and particularly for connecting the ends of leather cords depending from trolley arms of electric cars.

The invention has for its object to provide a simple and effective device of this character, and it consists in the improvements which I will now proceed to describe and claim.

Of the accompanying drawings: Figure 1 represents a side elevation of a coupling embodying my invention. Fig. 2 represents an end view of the same. Fig. 3 represents a view similar to Fig. 1 showing the spurs in their inoperative position. Fig. 4 represents a section on line 4—4 of Fig. 2. Figs. 5 and 6 represent perspective views of the chief parts of the coupling separated from each other.

The same reference characters indicate the same parts in all the figures.

In the drawings, 12 represents a metal tube open at both ends and provided with a plurality of longitudinal slots 13 of which three are here shown, the slots being closed at the end portions of the tube. To the central portion of the tube are attached elongated resilient metal strips, the central portions of which are rigidly secured, while their end portions are normally inclined outwardly from the tube and constitute inclined spring shanks 14 projecting over opposite end portions of the tube and registering with the slots therein. The outer ends of the shanks are provided with inwardly projecting sharpened spurs 15 adapted to enter the slots 13 and penetrate the end portions 16 of ropes or cords inserted in the tube. Mounted to slide on the exterior of the tube are two sleeves 17 which are adapted, in moving from the position shown by Fig. 3 to that shown by Fig. 1, to engage the inclined shanks and press the same with the spurs 15 inwardly, thus engaging the spurs with the ends 16. The tube 12 is provided at its end portions with outwardly projecting ears 18 preferably integral with the tube, these ears constituting stops which limit the outward movement of the sleeves 17. The shanks 14 are preferably secured to the tube by being brazed, riveted, or otherwise attached to a head or disk 19 inserted in the central portion of the tube and rigidly secured thereto in any suitable way. The shanks may be attached to the head 19 before the latter is inserted in the tube, the shanks at one side of the head being then pressed inwardly to enable them to enter one end of the tube, and the structure, including the shanks and the head 19, being then forced endwise into the tube until all the shanks are free to spring outwardly through the slots 13. The head 19 may be then brazed, soldered, or otherwise attached to the tube.

20 represents a collar which surrounds the central portion of the tube and extends across the portions of the shanks which bear on the head 19, the collar being rigidly secured to the tube. When the sleeves 17 are moved inwardly, as shown by Fig. 3, the shanks 14 and spurs 15 spring outwardly and release the ends 16. The parts above described are adapted to be assembled by slipping the sleeves 17 and collar 20 onto the tube before the ears 18 are bent outwardly, and slipping the head 19 and shanks 14 into the tube, either before or after the said ears are bent outwardly. The outward bending of the ears 18 prevents the removal of the sleeves 17, and the fastening of the head 19 and collar 20 to the tube completes the connection. The spurred shanks when pressed inwardly positively engage the cord ends, and are supported against outward displacement by the sleeves 17, and against lateral or edgewise displacement by the longitudinal edges of the slots 13, said edges bearing against the edges of the shanks so that the tube prevents any possibility of the displacement or bending of the spurred shanks by a twisting or torsional strain on the cord. The tube also prevents the bending of the portions of the cord engaged by the spurred shanks, and distortion of the shanks which would be caused by said bending.

I claim:

A coupling of the character stated, comprising a tube having longitudinal slots and open end portions forming sockets communicating with the slots, a head inserted in the tube between the ends thereof, elongated resilient strips attached to said head and projecting in opposite directions therefrom, the said strips registering with the slots and constituting spring shanks which normally project through the slots and are inclined outwardly from the tube and are provided at their outer ends with inwardly projecting spurs adapted to enter said slots, and sleeves slidable on the tube and adapted to force the shanks and spurs inwardly, the tube being provided at its end portions with integral ears adapted to be bent outwardly to form stops limiting the outward movement of the sleeves.

In testimony whereof I have affixed my signature, in presence of two witnesses.

GIOVANNI MONGARDI.

Witnesses:
  C. F. Brown,
  P. W. Pezzetti.

Copies of this patent may be obtained for five cents each, by addressing the "Commissioner of Patents, Washington, D. C."